P. H. WADDELL.
APPARATUS FOR WASHING PHOTOGRAPHIC PRINTS OR THE LIKE.
APPLICATION FILED FEB. 16, 1918.
1,332,965.
Patented Mar. 9, 1920.
4 SHEETS—SHEET 3.
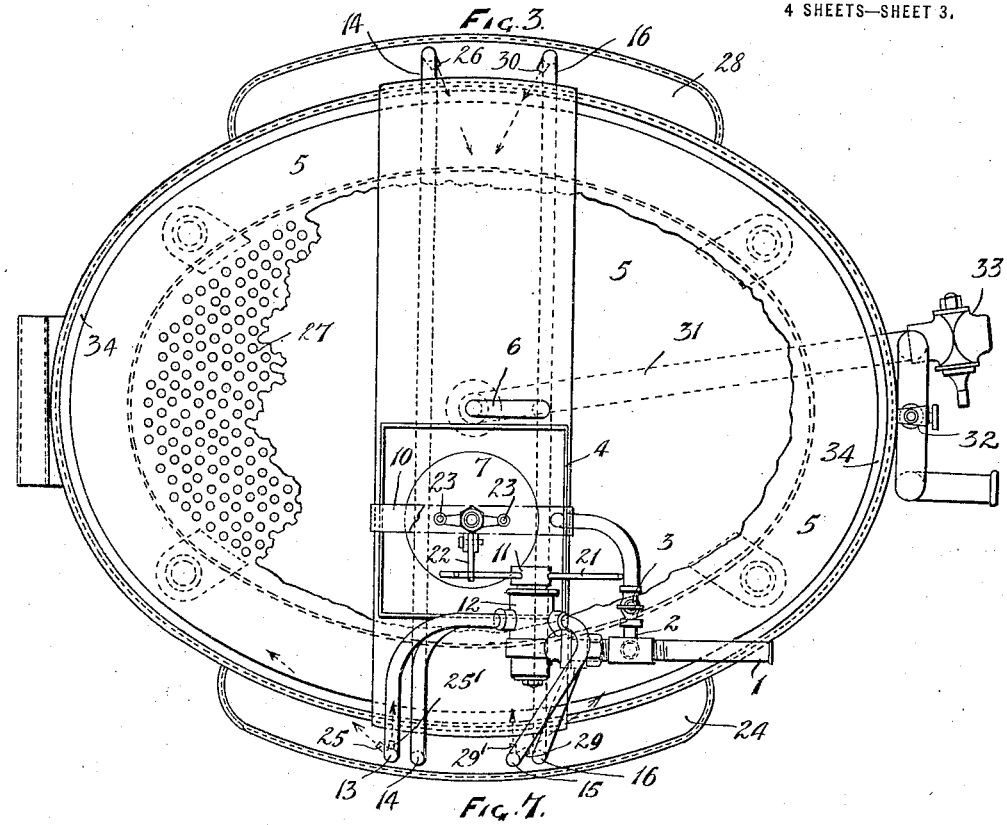
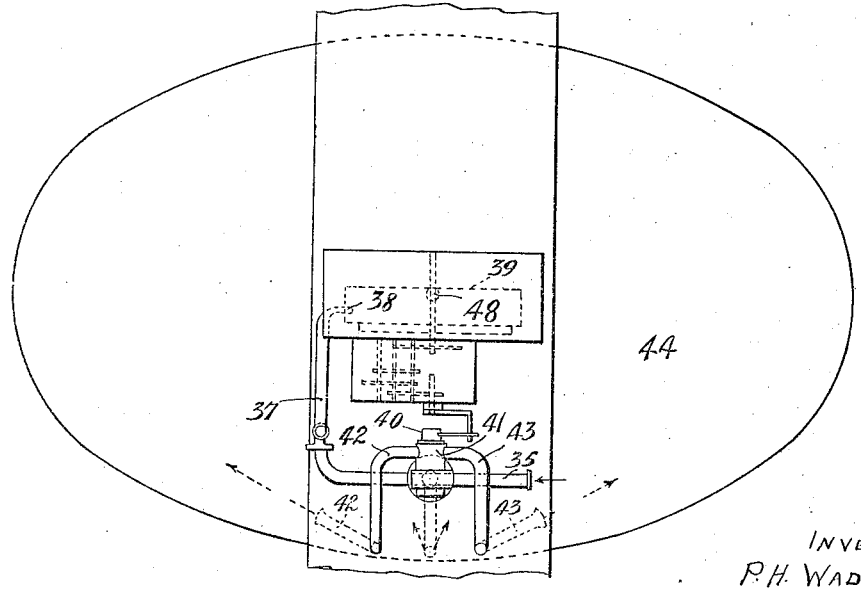
INVENTOR:
P. H. WADDELL
BY
ATTORNEY.

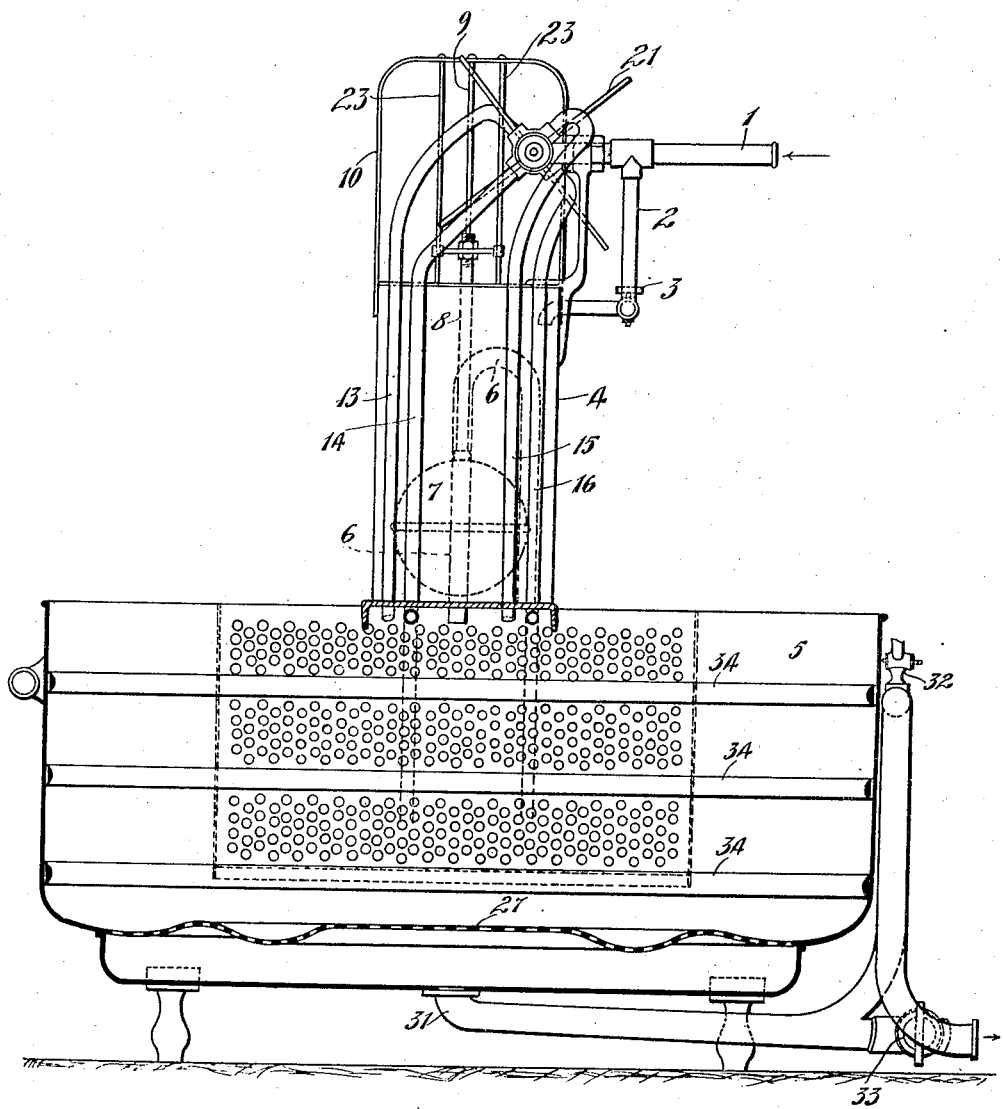

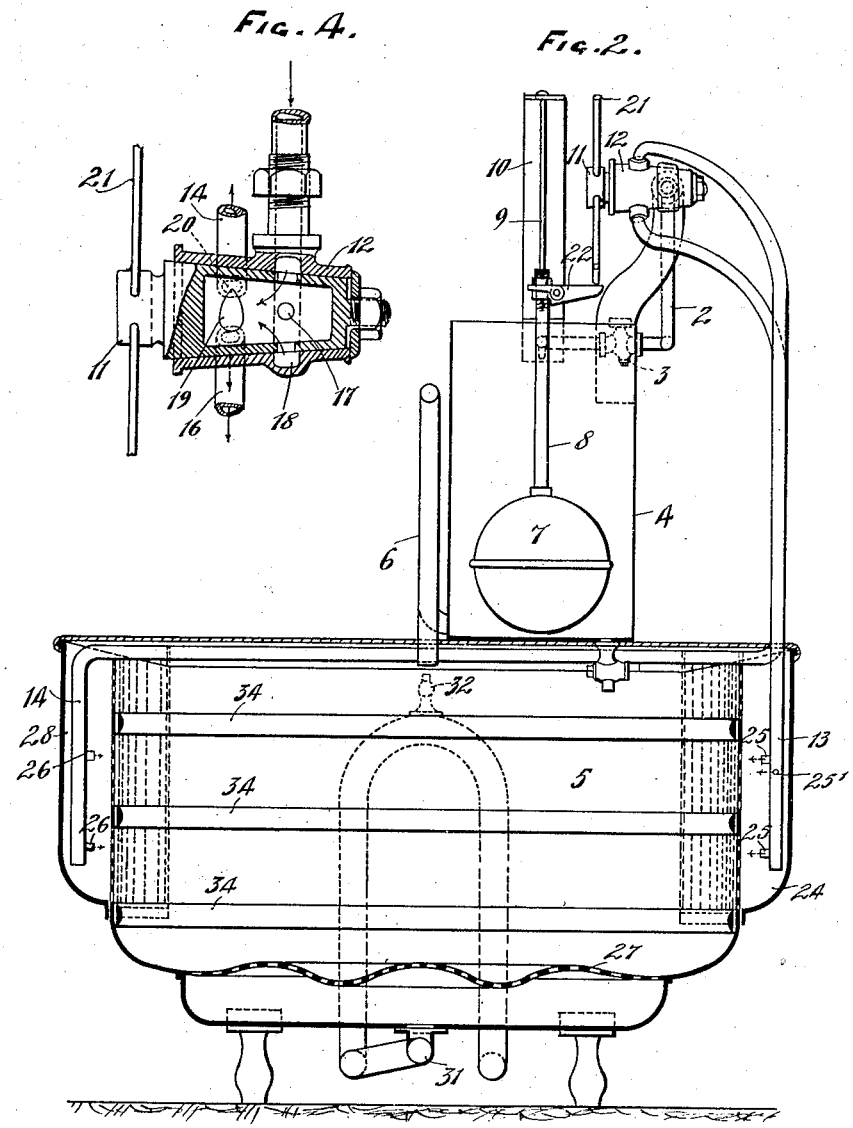

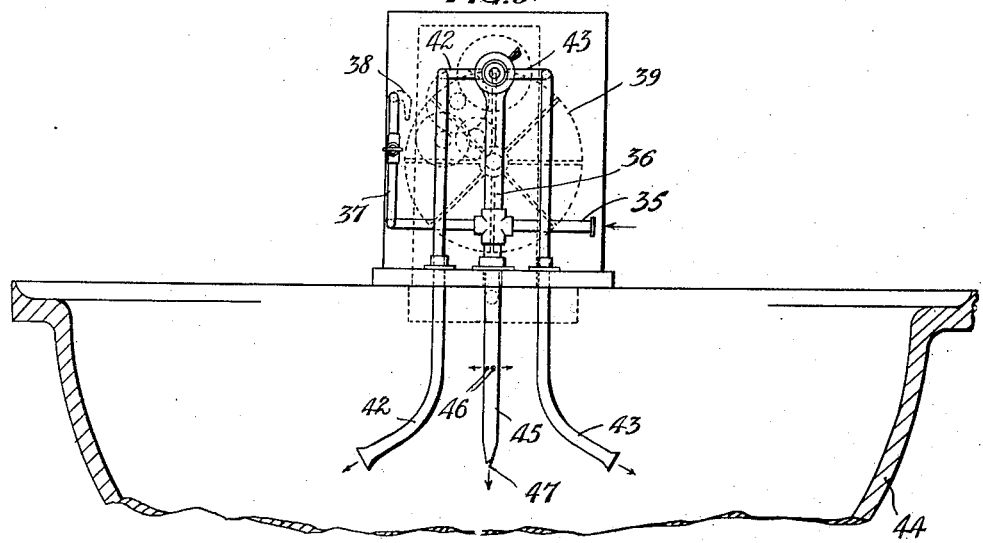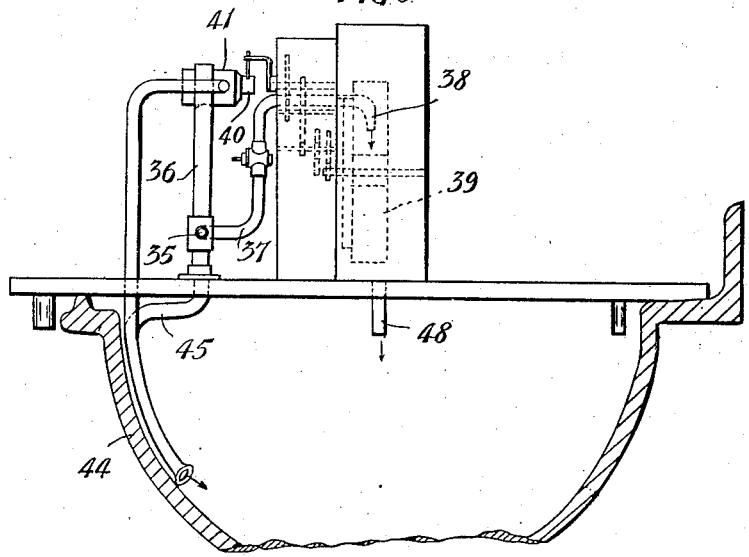

UNITED STATES PATENT OFFICE.

PETER H. WADDELL, OF TROON, SCOTLAND.

APPARATUS FOR WASHING PHOTOGRAPHIC PRINTS OR THE LIKE.

1,332,965.  Specification of Letters Patent.  Patented Mar. 9, 1920.

Application filed February 16, 1918. Serial No. 217,662.

*To all whom it may concern:*

Be it known that I, PETER HUGH WADDELL, a subject of the King of the United Kingdom of Great Britain and Ireland, and residing at Troon, Ayrshire, Scotland, have invented a certain new and useful Improvement in Apparatus for Washing Photographic Prints or the like, of which the following is a specification.

This invention relates to a device whereby photographic prints or other products may be washed free from hypo or other chemicals.

To receive the prints or the like there is employed a preferably oval basin or container for water in which the prints or the like may be immersed.

The primary object of the invention is to provide for rapid circulation of the water in the basin, with which object in view there are provided water conduits terminating in nozzles which deliver water intermittently in jets to the basin; said conduits being controlled by a multiple-way tap, say a four-way tap, the key element of which is rotated intermittently; or, in lieu of a four-way tap, there may be employed say a two-way tap with a continuously open by-pass in substitution for two of the ways of the four-way tap.

In the accompanying drawings Figures 1 and 2 are elevations partly in section at right angles to one another, Fig. 3 is a part sectional plan and Fig. 4 a sectional detail view showing one embodiment of the invention.

Referring to Figs. 1 to 4, 1 denotes a supply pipe to which water is conducted from any suitable source.

2 denotes a branch from said supply pipe 1, said branch 2 serving to lead water, (under control of a stop cock 3), into a tank 4 superimposed on the basin 5, said tank 4 being fitted with a siphon 6 adapted to discharge the water in the tank 4 when the water reaches a predetermined level in the tank. The speed with which the tank 4 fills depends on the rate of flow of water through the branch 2.

Sustained within said tank 4 is a ball float 7 which, when the siphonic discharge is effected, falls to the bottom of the tank 4. Projecting upwardly from the float 7 is a tube 8 of small diameter telescopically movable on the guide rod 9 held rigidly by a bracket 10 fixed to the top of the tank 4.

11 denotes the revoluble element or key of the multiple-way tap which derives rotary movement from the rising movement of the float 7.

The key 11 of the tap is hollow and formed with an annular series of perforations 17 in communication with an annular groove 18 in the barrel 12 of the tap whereby water received by the supply pipe 1 is admitted into the interior of the key. Formed in the key 11 is an elongated perforation 19 which in the rotation of the key 11 registers successively with four circular perforations 20 in the barrel 12, through which perforations 20 the water supply is delivered successively into the conduit pipes 13, 14, 15, 16.

Fitted to the key 11 are four arms or spokes 21 disposed at right angles to one another and adapted successively to obstruct the path of a trigger or striker 22 hingedly connected to the tube 8 and adapted to be guided, for example by two rigid rods 23 parallel to the tube 8. As will be understood, when the float 7 rises, the trigger 22 engages one of the four arms or spokes 21 and propels such arm and therewith the key 11 through a quarter of a revolution. The trigger 22 then remains under such spoke or arm. When the tank 4 is discharged, the float 7 and therewith the tube 8 and trigger 22 descend. The trigger 22, being hinged, is rigid in pushing upwardly against the arm or spoke propelled thereby, but in its downward movement it yields and trips over the next arm. The described movement of the float is repeated four times for every complete revolution of the key 11.

The conduit pipes 13, 14, 15 and 16 deliver water to the basin as follows.

The conduit pipe 13 from the first way of the tap is led into a pocket 24 outside the basin 5, and is fitted with two nozzles 25 (for small sizes of apparatus one nozzle may suffice) located say about one inch and three inches, respectively, beneath the water level in the basin, said nozzles 25 being arranged to direct their jets tangentially of the basin. The basin communicates with the pocket by way of perforations in the side of the basin and the nozzles are so arranged that, without themselves projecting or protruding, they direct their respective jets directly through individual perforations. In addition to the nozzles 25 an additional nozzle or outlet 25' is provided at a depth of say two inches from surface level, the jet from which additional nozzle is directed substantially radially through an individual perforation with the object of assisting to prevent adhesion of prints, etc., to the perforated side of the basin while the tangential jets are in operation.

The conduit 14 from the second way of the tap is provided with two nozzles 26 (or it might be a single nozzle) located about one inch and three inches, respectively, above the perforated inner bottom 27 of the basin at a point angularly spaced from the nozzle 25. The jets from the nozzles 26 are directed not quite radially but rather eccentrically so as to impinge upon the opposite side of the basin and cause prints, etc., contained in the basin to be carried toward the point whence they will be driven by the next flow from the opposite tangential jets. The stopped end of the pipe 14 and the nozzles 26 are contained within a pocket 28 similar to the pocket 24 and also in communication by way of perforations in the side of the basin with the interior of the basin, and the nozzles direct their respective jets directly through individual perforations.

The conduit pipe 15 from the third way of the tap is led to the pocket 24 and is provided with tangentially directed nozzles 29 facing in the opposite direction to the nozzles 25. An additional nozzle 29' directs a jet of small volume substantially radially and through an individual perforation.

The conduit pipe 16 from the fourth way of the tap is led to the pocket 28 and provided with nozzles 30 which direct jets converging toward the nozzles 26.

The siphon pipe 6 by way of which the contents of the tank 4 are discharged is directed toward and over the center of the basin and furnishes in effect an additional jet.

The basin is drained from the bottom by a waste pipe 31 which is fitted at the highest point with a cock 32 and may be arranged to act as a siphon or overflow according as the cock 32 is open or closed. 33 denotes a drain tap.

To prevent prints from getting into the pipe 31 the basin is formed with a double bottom of which the inner member 27 is perforated and formed with an undulating surface—with the object of assisting in separating and turning over prints that may tend to sink, and of creating additional eddies.

34 denotes internal ribs on the side of the basin presenting smooth convex surfaces so that prints cannot adhere closely to the side of the basin and so close the perforations therein.

What I claim is:—

1. In an apparatus for washing photographic prints and the like, in combination, a basin formed with spaced pockets communicating with the interior of the basin, a multiple-ways tap, a supply pipe connected to said tap, a unidirectionally rotatable key controlling the ways of said tap and a plurality of outlet conduits connected to said tap and having differently directed discharge ends within said pockets.

2. In an apparatus for washing photographic prints and the like, in combination, a basin formed with spaced pockets communicating with the interior of the basin, a multiple-ways tap, a supply pipe connected to said tap, a unidirectionally rotatable key controlling the ways of said tap, a plurality of outlet conduits connected to said tap and having discharge ends within said pockets, and a pipe for introducing water substantially centrally over said basin.

3. In an apparatus for washing photographic prints and the like, in combination, a water-containing basin having perforations in its side and formed with external pockets communicating with the interior of said basin by way of said perforations, said basin so shaped as to prevent adhesion of prints or the like to the side thereof, a multiple-ways tap, a supply pipe connected to said tap, and conduits also connected to said tap, said conduits having differently directed discharge ends within said pockets, said conduits serving to lead jets of water intermittently to said pockets.

4. In an apparatus for washing photographic prints and the like, in combination, a basin having perforations in its side and formed with external pockets communicating with the interior of said basin by way of said perforations, said basin having a double bottom, the inner member of which is perforated and undulated and its sides being formed with internal ribs, a multiple-ways tap, a supply pipe connected to said tap, and conduits also connected to said tap, said conduits having differently directed discharge ends within said pockets, said conduits serving to lead jets of water intermittently to said pockets.

In testimony whereof I have signed my name to this specification in the presence of two subscribing witnesses.

PETER H. WADDELL.

Witnesses:
HENRY MASON,
FLORENCE HOUSTON.